May 22, 1973  L. W. PIESTER  3,734,998
PROCESS FOR THE PRODUCTION OF HYDRAZOIC ACID
Filed Nov. 24, 1970
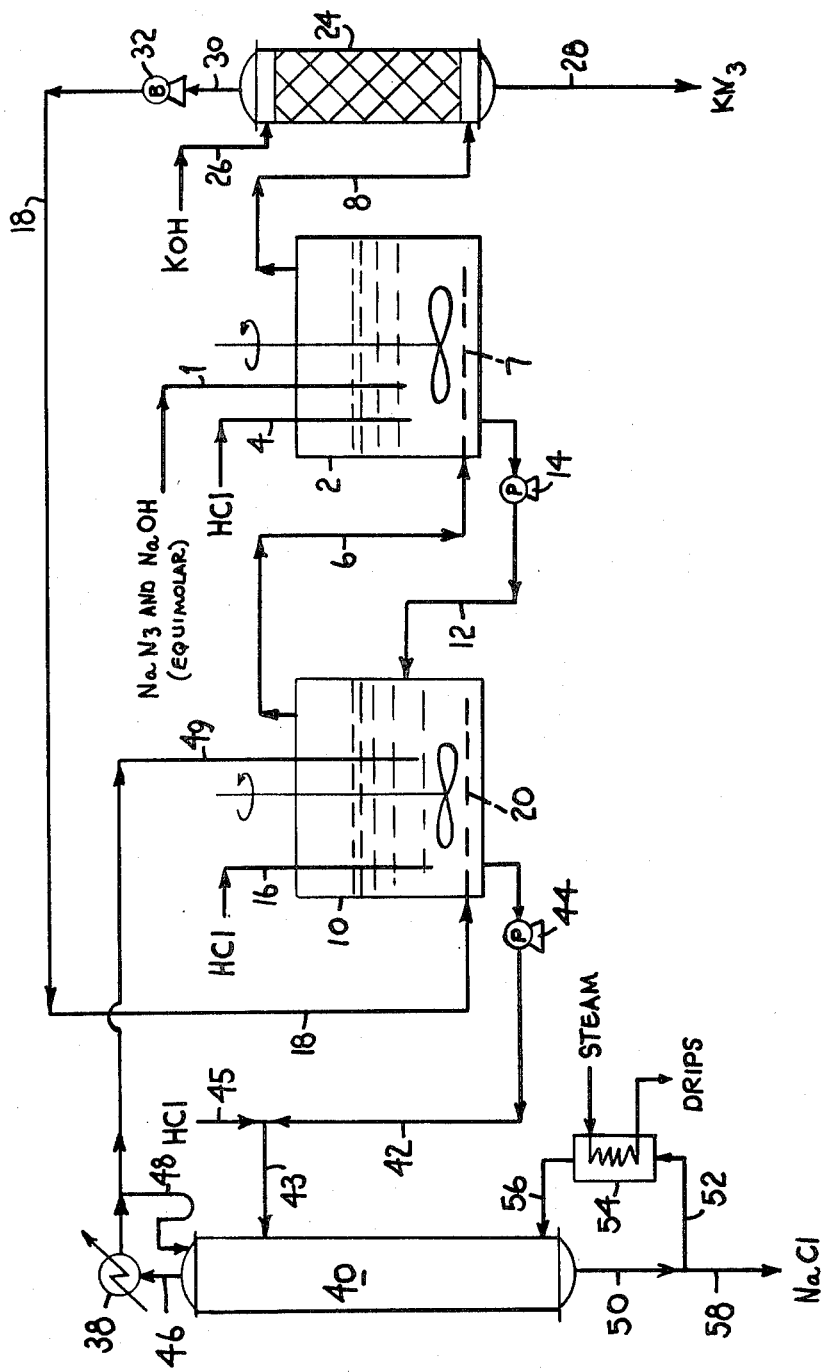
INVENTOR
LOYD W. PIESTER
BY Chisholm & Spencer
ATTORNEYS

United States Patent Office 3,734,998
Patented May 22, 1973

3,734,998
PROCESS FOR THE PRODUCTION OF
HYDRAZOIC ACID
Loyd W. Piester, New Martinsville, W. Va., assignor to
PPG Industries, Inc., Pittsburgh, Pa.
Filed Nov. 24, 1970, Ser. No. 92,341
Int. Cl. C01b 21/08
U.S. Cl. 423—406          25 Claims

ABSTRACT OF THE DISCLOSURE

The production of hydrazoic acid by acidifying an alkali metal azide or alkaline earth metal azide is described. Residual hydrazoic acid dissolved in the reaction mixture is stripped and recovered, thereby improving the yield of the process and reducing the azide contamination of the by-product liquid.

---

Hydrazoic acid is becoming of increasing importance, primarily as an intermediate in the preparation of various azide compounds such as its salts. Hydrazoic acid is bioactive and may be produced for those purposes. One particularly favorable use for hydrazoic acid is the preparation of alkali metal azide or alkaline earth metal azide by contacting the hydrazoic acid with the appropriate basic compounds such as the hydroxide.

Hydrazoic acid may be prepared by several processes for which the basic chemistry is known. However, refinements must be made to the laboratory processes employing the basic chemistry in order to achieve a commercially successful plant capable of producing sizable amounts of hydrazoic acid.

One of the known laboratory methods for producing hydrazoic acid is the acidification of at least one alkali metal azide or alkaline earth metal azide with an acid such as one or more of the strong mineral acids. Such a process without further refinement is wasteful of both acid and azide values.

It is the purpose of this invention to achieve a more efficient utilization of acid and azide values in the production of hydrazoic acid by the acidification of at least one alkali metal azide or alkaline earth metal azide with a feed acid. This is accomplished by stripping dissolved hydrazoic acid from a solution of by-product salt of the feed acid. The stripped hydrazoic acid may then be recovered. One method of recovery is to contact the stripped hydrazoic acid with the appropriate base to form a salt of hydrazoic acid as more fully hereinafter explained. This may be accomplished by forwarding the stripped hydrazoic acid directly from the stripping section to a contacting zone where it is contacted with the appropriate base. A preferred method is to return the hydrazoic acid to an acidification zone where feed azide is reacted with feed acid to produce additional hydrazoic acid. This latter method is particularly advantageous when additional acid values accompany the hydrazoic acid from the stripping section. Stripped hydrazoic acid and newly produced additional hydrazoic acid may then be forwarded to the contacting zone where it is contacted with the appropriate base to form the hydrazoic acid salt.

The azide treated with feed acid, hereinafter called the feed azide, is usually sodium azide. Acidification may be by either a batch process or a continuous process. It may be conducted in one or more stages. A plurality of stages may be connected in series, in parallel, or both in series and in parallel.

Any of the acids which are stable and more acidic than hydrazoic acid may be used as the feed acid. The strong mineral acids are ordinarily used. Exemplary strong mineral acids are hydrochloric acid, sulfuric acid, nitric acid, and orthophosphoric acid. Other acids such as acetic acid are suitable. Of course, gases such as hydrogen chloride, sulfur trioxide, or nitric acid may be used if water is introduced elsewhere so as to form the acid in situ.

The dissolved hydrazoic acid may optionally be stripped in the presence of added quantities of a strong acid. The strong acid, like the feed acid, may be any of the acids which are stable and more acidic than hydrazoic acid. The strong mineral acids are most often employed. Hydrochloric acid, sulfuric acid, nitric acid, orthophosphoric acid, or acetic acid are ordinarily used. Most often the strong acid and the feed acid are the same. In solution, hydrazoic acid dissociates in accordance with the equilibrium $$HN_3 \rightleftharpoons H^+ + N_3^-$$

The purpose in adding the strong acid prior to or during stripping is to shift the equilibrium to the left in accordance with Le Chatelier's principle. The strong acid is most advantageously employed when the pH of the by-product stream is relatively high, e.g., above pH 3, although the acid may be added to a by-product stream having lower pH values. Any amount of strong acid may be used. The particular amount will depend upon the desired degree the equilibrium is shifted to the left.

The amount of feed acid employed may vary widely. If it is desired to convert only a portion of the feed azide to hydrazoic acid, the amount of feed acid used will be less than the stoichiometric amount. If substantially all of the feed azide is to be converted to hydrazoic acid, a stoichiometric amount or an excess of feed acid should be used. Of course, any basic impurities present in the feed azide should be accounted for in determining the amount of feed acid to use. Ordinarily enough acid is used to lower the pH of the reaction mixture to at least 6. A pH range of from about 1 to about 5 is typical. A range of about 2 to about 3 is preferred.

The reaction temperature may vary widely. The reaction is usually carried out at a temperature ranging from about 0° C. to about 100° C. A range of from about 40° C. to about 90° C. is typical. The preferred temperature range is from about 75° C. to about 80° C.

Atmospheric pressure is normally employed although higher or lower pressures may be used.

The basic principles of the present invention are illustrated by reference to the figure. The illustrated process shows the formation of hydrazoic acid by acidifying sodium azide with hydrochloric acid. The hydrazoic acid so produced is contacted with potassium hydroxide to produce potassium azide although the hydrazoic acid can be put to a number of other uses. Because sodium azide produced by the Wislicenus method produces one mole of sodium hydroxide for each mole of sodium azide produced, it is often convenient to acidify the mixture rather than separate the sodium hydroxide from the sodium azide before acidifying the sodium azide. If the sodium hydroxide is not removed, additional acid will be required to neutralize it when the sodium azide is acidified.

Referring now in more detail to the figure, equimolar portions of sodium azide and sodium hydroxide are fed through line 1 to mix tank 2 where they are contacted with hydrochloric acid introduced through line 4. A gas stream containing mostly nitrogen, a small percentage (usually about 3 percent) of hydrazoic acid, some water vapor, and some hydrogen chloride is introduced through line 6 and sparger 7 after which it is bubbled through the mixture in mix tank 2 to dilute any hydrazoic acid formed and sweep it from the mix tank through line 8. Because hydrazoic acid is explosive in concentrated amounts, dilution by an inert gas such as nitrogen, helium, argon, neon, xenon, krypton, air, methane, ethane, water vapor, $CF_4$, $CF_3Cl$ or mixtures thereof is desirable to reduce the possibility of an explosion. The gas in line 8 advantageously contains about 5 to 8 percent hydrazoic acid. Greater or lesser proportions may be used if desired. Liquid from mix tank 2 having a pH of about 5 to 6 is forwarded to mix tank 10 through line 12 by pump 14. Hydrochloric acid is introduced through line 16 and/or line 49 to lower the pH of the reaction mixture to about 2 to 3. Nitrogen containing small amounts of hydrazoic acid and water vapor is introduced through line 18 and sparger 20 to sweep hydrazoic acid from mix tank 10 through line 6 and into the mixture contained in mix tank 2. A gas stream including nitrogen, hydrazoic acid, and water vapor is passed through line 8 to scrubber 24 where it is contacted with aqueous potassium hydroxide introduced through line 26. The scrubber may be of any of many conventional designs such as, for example, a bubble cap column, sieve tray column, packed column, spray column, disc and donut column, or liquid filled column. Flow may be either countercurrent or parallel. In the figure a packed column utilizing countercurrent flow is shown. Potassium azide solution removed from scrubber 24 through line 28 may be used directly as an aqueous solution or it may be forwarded for further processing such as crystallization, drying, and packaging. Nitrogen, some water vapor, and a small amount (on the order of about 1 percent) hydrazoic acid are removed from scrubber 24 through line 30 where they are forwarded by blower 32 to line 18 and thence into mix tank 10. It may be seen that nitrogen is recycled through mix tanks 2 and 10 and through scrubber 24 thereby containing most of the hydrazoic acid within the system. Make-up nitrogen may be added at any convenient location in the nitrogen system. Should there be any build-up of inert gases in the nitrogen system, the excess may be vented, preferably through a basic solution to neutralize any hydrazoic acid present. Liquid from mix tank 10 usually contains some dissolved hydrazoic acid which is often advantageously recovered. Stripping column 40 is suitable for this purpose. The stripping column itself is of conventional design and may conveniently be a bubble cap column, a sieve tray column, a packed column, or some similar device. Liquid from mix tank 10 is passed through lines 42 and 43 by pump 44 and introduced to stripping column 40 at or near the top thereof. Hydrochloric acid may optionally be added to the column to reduce the concentration of dissociated hydrazoic acid. This may be done by adding hydrochloric acid to the liquid through line 45 before the liquid is introduced to the column through line 43, as shown. Alternatively, the hydrochloric acid may be added directly to the column through a separate line. Vapor taken from the top of column 40 is passed through line 46 to condenser 38. Condensate from condenser 38 is split into two streams: reflux and overhead. Reflux is returned to the column by line 48. Overhead is taken through line 49 and introduced to mix tank 10. Bottoms, comprising principally sodium chloride solution, are removed from the stripping column through line 50 and split into two streams. One of these streams passes through line 52 to reboiler 54 where it is heated and returned to stripping column 40 through line 56. The other stream passes through line 58 for use or disposal of the by-product salt solution.

The above system for recovery of hydrazoic acid from a solution containing the by-product salt of the feed acid has been described with respect to a continuous process for producing hydrazoic acid, but the principles are equally applicable to a batch process.

Although the detailed process for the production of hydrazoic acid which has been described has been incorporated into an over-all process for converting sodium azide into potassium azide using hydrazoic acid as an intermediate, it will be appreciated that flexibility is an outstanding advantage. By varying the identities of the feed azide and the base fed to the scrubber, a large number of azides may be converted to other azides. Thus, an alkali metal azide may be converted into another alkali metal azide as shown in detail herein, alkali metal azide may be converted into alkaline earth metal azide, alkaline earth metal azide may be converted to alkali metal azide, and alkaline earth metal azide may be converted to another alkaline earth metal azide. Even the same azide as the feed azide may be regenerated by scrubbing with the appropriate base. Feed azides suitable for use in this invention include lithium azide, sodium azide, potassium azide, rubidium azide, cesium azide, beryllium azide, magnesium azide, calcium azide, strontium azide, and barium azide. Of the alkali metal azides, sodium azide and potassium azide are most often used. Sodium azide is preferred. Of the alkaline earth metal azides, magnesium azide, calcium azide, strontium azide, and barium azide are most often used. Magnesium azide and calcium azide are preferred. Of course, mixtures of azides are suitable for use.

The base selected for feeding to the scrubber may be any soluble hydroxide or salt of the alkali metals or alkaline earth metals which will react to form the azide. Exemplary salts are the soluble carbonates such as sodium carbonate or potassium carbonate. Even slightly water-soluble compounds such as calcium carbonate or magnesium carbonate may be used. It is convenient to utilize a slurry of the slightly-soluble salts which react with hydrazoic acid in order to promote both mutual contact of the salt and hydrazoic acid and ease of handling. Examples of compounds suitable for feeding to the scrubber include lithium hydroxide, sodium hydroxide, potassium hydroxide, rubidium hydroxide, cesium hydroxide, magnesium hydroxide, calcium hydroxide, strontium hydroxide, barium hydroxide, dimethylberyllium (anhydrous solvent), diethylmagnesium (anhydrous solvent), magnesium carbonate, and calcium carbonate.

While the invention has been described with reference to certain illustrative embodiments, it is not intended that it should be limited thereby except insofar as appears in the accompanying claims.

What is claimed is:

1. In the method of preparing hydrazoic acid from a feed azide selected from the group consisting of alkali metal azide and alkaline earth metal azide wherein said feed azide is contacted with a feed acid to generate hydrazoic acid and to form a solution of by-product salt selected from the group consisting of alkali metal salt of said feed acid and alkaline earth metal salt of said feed acid, said solution also containing dissolved hydrazoic acid, the improvement comprising stripping said dissolved hydrazoic acid from said solution by:

(a) introducing said solution to a stripping column at or near the top thereof;
   (b) supplying heat at or near the bottom of said stripping column to boil a portion of the bottoms;
   (c) removing bottoms product;
   (d) removing vapor from the top of said stripping column;
   (e) passing said removed vapor through a condenser to form a condensate;
   (f) returning a portion of said condensate to said stripping column as a reflux;
   (g) removing the remainder of the condensate as overhead product; and
   (h) contacting said overhead with further quantities of said feed acid.

2. The method of claim 1 wherein said feed acid is a strong mineral acid.

3. The method of claim 2 wherein said strong mineral acid is sulfuric acid.

4. The method of claim 2 wherein said strong mineral acid is hydrochloric acid.

5. The method of claim 1 wherein said feed azide is sodium azide.

6. In the method of preparing an azide selected from the group consisting of alkali metal azide and alkaline earth metal azide wherein a feed azide selected from the group consisting of alkali metal azide and alkaline earth metal azide is contacted with a feed acid to generate hydrazoic acid and form a solution of by-product salt selected from the group consisting of alkali metal salt of said feed acid and alkaline earth metal salt of said feed acid, said solution also containing dissolved hydrazoic acid, and wherein generated hydrazoic acid is contacted with a basic compound of at least one alkali metal or alkaline earth metal, the improvement comprising stripping said dissolved hydrazoic acid from said solution by:

(a) introducing said solution to a stripping column at or near the top thereof;
(b) supplying heat at or near the bottom of said stripping column to boil a portion of the bottoms;
(c) removing bottoms product;
(d) removing vapor from the top of said stripping column;
(e) passing said removed vapor through a condenser to form a condensate;
(f) returning a portion of said condensate to said stripping column as a reflux;
(g) removing the remainder of the condensate as overhead product; and
(h) contacting said overhead with further quantities of said feed acid.

7. The method of claim 6 wherein said feed acid is a strong mineral acid.
8. The method of claim 7 wherein said strong mineral acid is sulfuric acid.
9. The method of claim 7 wherein said strong mineral acid is hydrochloric acid.
10. The method of claim 6 wherein the feed azide is sodium azide.
11. The method of claim 6 wherein said dissolved hydrazoic acid is stripped in the presence of added quantities of a strong acid.
12. The method of claim 11 wherein said strong acid is the same as said feed acid.
13 The method of claim 12 wherein said feed acid is a strong mineral acid.
14. The method of claim 13 wherein said strong mineral acid is sulfuric acid.
15. The method of claim 13 wherein said strong mineral acid is hydrochloric acid.
16. The method of claim 11 wherein said feed azide is sodium azide.
17. In the method of preparing potassium azide from sodium azide wherein said sodium azide is contacted with a feed acid to generate hydrazoic acid and form a solution of by-product sodium salt of said acid, said solution also containing dissolved hydrazoic acid, and wherein generated hydrazoic acid is contacted with potassium hydroxide to produce potassium azide, the improvement comprising stripping said dissolved hydrazoic acid from said solution by:

(a) introducing said solution to a stripping column at or near the top thereof;
(b) supplying heat at or near the bottom of said stripping column to boil a portion of the bottoms;
(c) removing bottoms product;
(d) removing vapor from the top of said stripping column;
(e) passing said removed vapor through a condenser to form a condensate;
(f) returning a portion of said condensate to said stripping column as a reflux;
(g) removing the remainder of the condensate as overhead product; and
(h) contacting said overhead with further quantities of said feed acid.

18. The method of claim 17 wherein said feed acid is a strong mineral acid.
19. The method of claim 18 wherein said strong mineral acid is sulfuric acid.
20. The method of claim 18 wherein said strong mineral acid is hydrochloric acid.
21. The method of claim 17 wherein said dissolved hydrazoic acid is stripped in the presence of added quantities of a strong acid.
22. The method of claim 21 wherein said strong acid is the same as said feed acid.
23. The method of claim 22 wherein said feed acid is a strong mineral acid.
24. The method of claim 23 wherein said strong mineral acid is sulfuric acid.
25 The method of claim 23 wherein said strong mineral acid is hydrochloric acid.

References Cited

UNITED STATES PATENTS 3,309,295   3/1967   Cahn et al. _____ 203—49 X

FOREIGN PATENTS 938,720   10/1948   France _____ 23—101
435,654   10/1926   Germany _____ 23—157

OTHER REFERENCES

Reitzner, Bruno et al., Picatinny Arsenal Technical Memorandum 1186, Dover, N.J., 1963.

Audrieth, L. F., "Chemical Reviews," vol. 15, 1934, p. 180.

Walker et al., Principles of Chemical Engineering, 3rd ed. McGraw Hill Book Co., N.Y., 1937, pp. 545–53.

GEORGE O. PETERS, Primary Examiner